United States Patent [19]

Doane et al.

[11] Patent Number: 4,890,902
[45] Date of Patent: * Jan. 2, 1990

[54] LIQUID CRYSTAL LIGHT MODULATING MATERIALS WITH SELECTABLE VIEWING ANGLES

[75] Inventors: J. William Doane; Eugene P. Wenninger, both of Kent; John West, Stow, all of Ohio; Bao-Gang Wu, Richardson, Tex.

[73] Assignee: Kent State University, Kent, Ohio

[ * ] Notice: The portion of the term of this patent subsequent to Jun. 9, 2004 has been disclaimed.

[21] Appl. No.: 159,223

[22] Filed: Feb. 23, 1988

Related U.S. Application Data

[63] Continuation-in-part of Ser. No. 60,184, Jun. 9, 1987, abandoned, which is a continuation-in-part of Ser. No. 776,831, Sep. 17, 1985, Pat. No. 4,688,900, and a continuation-in-part of Ser. No. 866,216, May 22, 1986, Pat. No. 4,685,771, and a continuation-in-part of Ser. No. 879,269, Jun. 27, 1986, Pat. No. 4,673,255, and a continuation-in-part of Ser. No. 879,327, Jun. 27, 1986, Pat. No. 4,671,618, said Ser. No. 879,269, and Ser. No. 879,327, is a continuation of Ser. No. 866,216, May 22, 1986, Pat. No. 4,685,771, and a continuation-in-part of Ser. No. 776,831, Sep. 17, 1985, Pat. No. 4,688,900, said Ser. No. 866,216, is a continuation-in-part of Ser. No. 776,831, Sep. 17, 1985, Pat. No. 4,688,900, which is a continuation-in-part of Ser. No. 590,996, Mar. 19, 1984, abandoned.

[51] Int. Cl.[4] .............................................. G02F 1/13
[52] U.S. Cl. .............................. 350/347 V; 350/335; 350/347 R; 350/351; 428/1; 340/705; 252/299.01
[58] Field of Search ............. 350/335, 347 R, 347 V, 350/351; 428/1; 340/705; 252/299.01, 299.5, 299.6

[56] References Cited

U.S. PATENT DOCUMENTS

| | | | |
|---|---|---|---|
| 3,600,060 | 8/1971 | Churchill et al. | 350/351 X |
| 3,877,790 | 4/1975 | Robinson | 350/344 X |
| 3,961,181 | 6/1976 | Golden | 250/208 |
| 4,048,358 | 9/1977 | Shanks | 350/351 X |
| 4,411,495 | 10/1983 | Beni et al. | 350/347 V |
| 4,579,423 | 4/1986 | Fergason | 350/347 V X |
| 4,596,445 | 6/1986 | Fergason | 350/347 V X |
| 4,671,618 | 6/1987 | Wu et al. | 350/347 V |
| 4,688,900 | 8/1987 | Doane et al. | 350/347 V |
| 4,693,560 | 9/1987 | Wiley | 350/347 V X |
| 4,707,080 | 11/1987 | Fergason | 350/347 V X |

OTHER PUBLICATIONS

H. G. Craighead et al., "New Display Based on Electrically Induced Index Matching in an Inhomogeneous Medium", Appl. Phys. Lett., vol. 40, No. 1, Jan. 1, 1982, pp. 22–24.

Primary Examiner—Stanley D. Miller
Assistant Examiner—Richard F. Gallivan
Attorney, Agent, or Firm—Watts, Hoffmann, Fisher & Heinke

[57] ABSTRACT

A light modulating material comprising phase-separated microdroplets of liquid crystal in a light transmissive, synthetic resin matrix wherein the index of refraction $n_p$ of the matrix is matched or mismatched to an index of refraction $N_o$ of the liquid crystal optical axis of the microdroplets so that when the microdroplet director is aligned relative to a surface of the material, maximum transmission of light occurs at a selected oblique angle relative to the surface of the material or at a selected narrow angle about the perpendicular to the surface of the material. Such matching or mismatching of indices of refraction may be accompanied by phase separation in an external magnetic or electric field, or by shaping the liquid crystal microdroplet into an ovoid or the like during or after phase separation to align the microdroplet directors thereby endowing the material with a permanent and movable viewing angle. One or more sheets of the improved light modulating material may be incorporated into a window or an electrooptic display device to provide angularly discriminating windows or displays that are transparent or visible only at selected angles of view and that are opague at other angles of view.

39 Claims, 6 Drawing Sheets

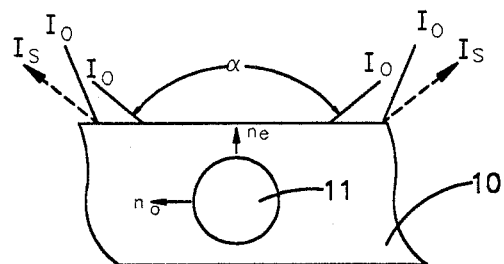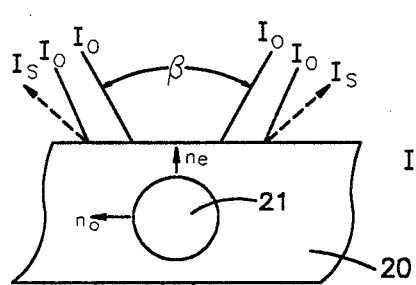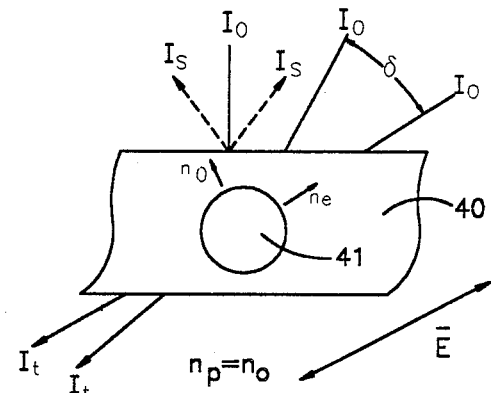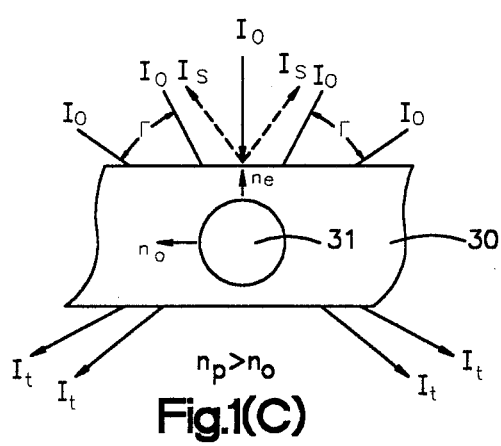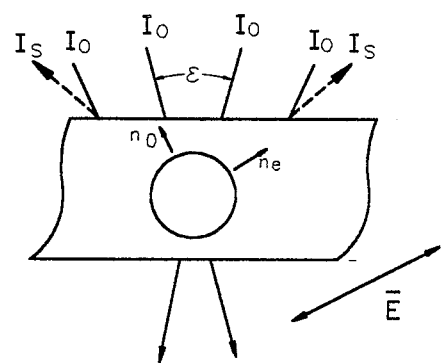

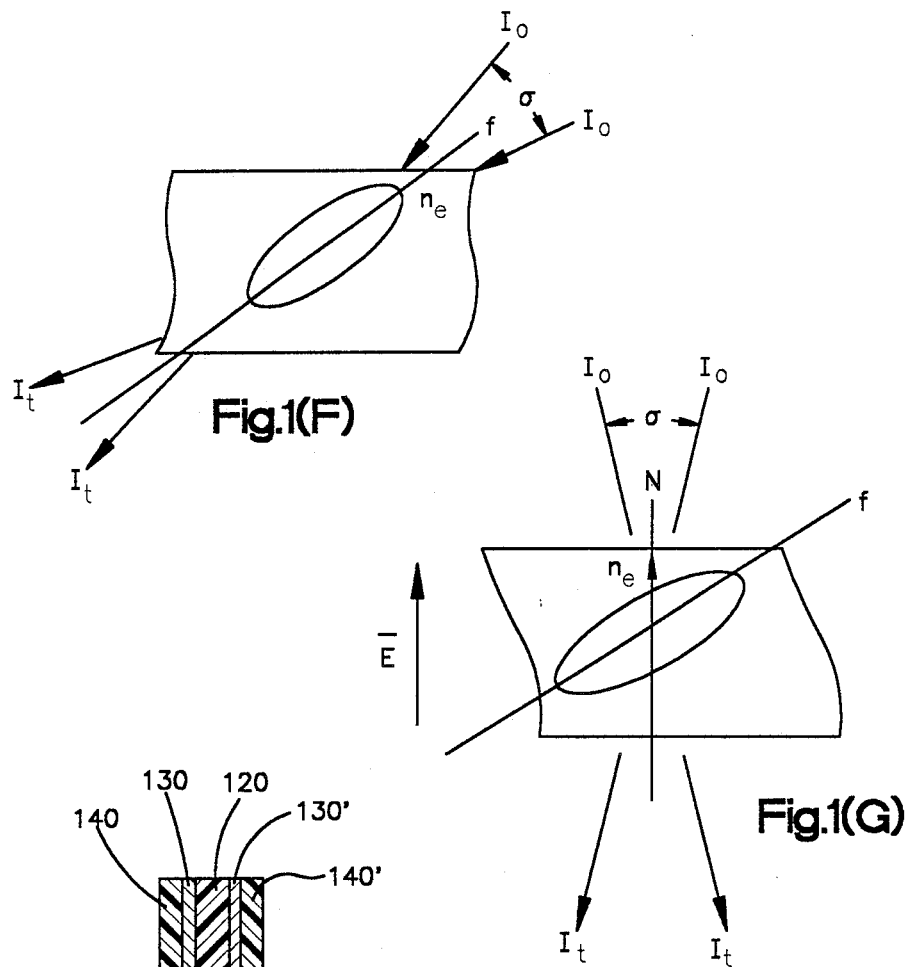

LIQUID CRYSTAL LIGHT MODULATING MATERIALS WITH SELECTABLE VIEWING ANGLES

RELATED APPLICATIONS

This application is a continuation-in-part of application Ser. No. 060,184, filed June 9, 1987, now abandoned, which is a continuation-in-part of U.S. Ser. No. 776,831, filed 9/17/85 now U.S. Pat. No. 4,688,900, U.S. Ser. No. 866,216, filed 5/22/86, now U.S. Pat. No. 4,685,771, Ser. No. 879,269, filed 6/27/86, now U.S. Pat. No. 4,673,255 and Ser. No. 879,327, filed 6/27/86 now U.S. Pat. No. 4,671,618. Ser. Nos. 879,269 and Ser. No. 879,327 are continuations-in-part of 60th Ser. No. 866,216 and 776,831. U.S. Ser. No. 866,216 is a continuation-in-part of Ser. No. 776,831 which itself is a continuation-in-part of Ser. No. 590,996, filed Mar. 19, 1984, now abandoned, the disclosures of which are incorporated herein by reference.

TECHNICAL FIELD

This invention relates to liquid crystal light modulating materials comprising phase separated microdroplets of liquid crystal in a light transmissive, synthetic resin matrix and, more particularly, to liquid crystal light modulating materials with selectable viewing angles; such materials can be transparent over a narrow viewing angle about the perpendicular to the surface of the material or transparent at an oblique angle relative to the surface of the material or transparent at an angle that is adjustable according to the strength of an applied external field; such materials are employed in various windows and electrooptic displays, and wherever it is desirable to be able to adjust the angle at which a display is visible or a window is transparent.

BACKGROUND OF THE INVENTION

Techniques of preparing liquid crystal light modulating materials by phase separation, as well as the advantages offered by such techniques and the materials prepared thereby, are discussed in U.S. Pat. Nos., 4,671,618, 4,673,255, 4,685,771 and 4,688,900, the disclosures of which are hereby incorporated by reference.

Switchable electro-optic display cells exhibiting a varying gray scale between substantial transparency and substantial opacity are proposed in U.S. Pat. No. 4,411,495 and in *Applied Physics Letters*, Vol. 40, p. 22 (1982). Such display cells employ anisotropic suspensions imbibed into a porous cellulosic material sandwiched between transparent electrodes; in the '495 patent, the anisotropic suspension comprises particulates, whereas in the *Applied Physics Letters article, the anisotropic suspension comprises nematic liquid crystal with positive dielectric anisotropy. The operation of these display cells depends upon matching or mismatching the index of refraction of the isotropic porous material to the index of refraction of the anisotropic liquid crystal or anisotropic particulate suspension. Transparency is achieved when the index of refraction of the porous material matches the index of refraction presented to incident light by the material within the pores. The orientation of the liquid crystal or particle within the pores is generally random in the absence of an applied field and in the presence of a field generally parallel to the direction of the field. Thus, in the absence of an applied field, the material in the pores presents an overall index of refraction $\bar{n}$, equal to a value between the ordinary $n_o$ and extraordinary $n_e$ indices of refraction.*

Transparency in the field-off condition takes place when the index of refraction of the porous material is matched to the overall index of refraction $\bar{n}$ of the material in the pores. Subsequent application of a field results in the liquid crystals or particles tending to align in the direction of the field, thus changing the index of refraction presented to probing light, with resultant scattering or opacity.

A display cell that operates in a manner opposite to that just described is obtained where the index of refraction of the porous material is matched to the ordinary index of refraction $n_o$ of the liquid crystal or particle. In this case, application of a field results in the liquid crystal or particle aligning with the field and presenting its ordinary index of refraction $n_o$ to incident light so that it detects no mismatch between the indices and is transmitted. Subsequent removal of the field results in a return to a random state wherein an overall refractive index $\bar{n}$, not equal to that of the porous material, is presented to incoming light which is then scattered with the cell appearing opaque. Between the extrema of maximum transparency and maximum opacity, a gray scale is achievable as a function of the voltage applied across the cell.

Each of the above two modes of operation displays a different profile at which the cell is transparent to a viewer. In the case where the index of refraction of the porous material is matched to the overall index of refraction $\bar{n}$ of the randomly aligned liquid crystal or anisotropic suspension (field-off transparency) the device appears transparent to a viewer from essentially all directions of view due to the fact that the overall index of refraction $\bar{n}$ is essentially isotropic, i.e., the same for all viewing angles. But in the case where the index of refraction of the porous material is matched to the ordinary index of refraction $n_o$ of the aligned liquid crystal (field-on transparency), the device appears most transparent viewed directly in the direction of the field (usually orthogonal to the cell), with the transparency falling off at increasingly oblique viewing angles due to the fact that the index of refraction in the aligned state is anisotropic: the further from the orthogonal the viewing angle, the greater the mismatch between the perceived indices until an essentially opaque appearance is detected by the viewer at an oblique enough angle.

While the described display cells make it possible to some extent to regulate the angle of view through a cell, these and other types of liquid crystal cells fabricated by the mechanical entrapment of liquid crystals in porous sheets or into capsules of polyvinyl alcohol or the like have a number of drawbacks. One of the drawbacks is the essentially unalterable index of refraction of the various entrapment materials: matching or mismatching is a trial and error process.

The techniques of the present invention make possible the fabrication of light modulating liquid crystal materials having "customized" viewing angles in the sense that the angle at which a window or display fabricated with such material is transparent or visible is predetermined by a deliberate matching or mismatching of the index of refraction of the synthetic resin matrix with a selected index of refraction of the anisotropic liquid crystal. Specific devices resulting from this invention include windows for head-up displays, sunscreens, windows with a built-in "venetian blind" feature and, in general, devices wherein the direction of transmission of incident light is restricted or modified as compared to previously described devices.

DISCLOSURE OF THE INVENTION

The invention provides a light modulating material comprising phase separated microdroplets of liquid crystal in a light transmissive, synthetic resin matrix wherein the index of refraction $n_p$ of the matrix is matched or mismatched to an effective index of refraction $n_{mt}$ of the liquid crystal microdroplet so that when the microdroplet director is aligned relative to a surface of the material, maximum transmission of light occurs at a selected oblique angle relative to the surface of the material or at a selected narrow angle about the perpendicular to the surface of the material. Such matching or mismatching of indices of refraction i.e. accompanied by phaseseparation in an external magnetic or electric field, or by shaping the liquid crystal microdroplet into an ovoid or the like during or after phase separation to cause an alignment of all the liquid crystal microdroplet directors in the same direction, thereby endowing the material with a permanent and movable viewing angle at which the material or a display fabricated therewith is transparent or visible. One or more sheets of the improved light modulating material may be incorporated into a window or an electro-optic display device to provide angularly discriminating windows or displays that are transparent or visible only at selected angles of view and that are opaque at other angles of view.

As used in the specification and the claims, the term "phase separation" refers to the processes described in the patents and application referred to above as proenitors of the present application. Phase separation techniques yield a light modulating material having a multitude of discrete microdroplets of liquid crystal in a light-transmissive synthetic resin matrix. Initially the liquid crystal is dissolved in fluent or soft matrix-providing composition; as the matrix hardens the microdroplets form spontaneously. Hardening for this purpose can include "curing," "setting" and "gelling." The hardening can be from one or more changes ensuing in the matrix such as polymerizing, cross-linking, cooling for example, in the case of a thermoplastic polymer matrix, or the loss of volatile material that is solvent for both the matrix-providing composition and the liquid crystal.

To simplify reference to these various methods of "phase separation" the following acronyms are used: "SIPS" for Solvent-Induced Phase Separation wherein volatile solvent is removed to precipitate microdroplet formation and hardening; "TIPS" for Thermally-Induced Phase Separation wherein cooling induces microdroplet formation as well as hardening of the matrix; and "PIPS" Polymerization-Induced Phase Separation wherein initial polymerization or further polymerization by addition, condensation, or cross-linking or a combination of these mechanisms provides the microdroplet formation and the setting up of the matrix. The setting, curing or hardening of the finished matrix in sheet form is performed once with a thermosetting matrix, but can be done repeatedly with a thermoplastic matrix. "Hardening" with reference to the matrix denotes rendering the microdroplets stable as to size and position. The matrix itself need not be brittle; it may be somewhat flexible and deformable in its useful "hardened" state. Average diameter of the microdroplets for modulating light can be as large as about 50 $\mu$m and generally is between about 0.2 and 10 $\mu$m.

The phase separation technique allows for the matching of the index of refraction of the matrix $n_p$ to an effective index of refraction $n_{mt}$ of the liquid crystal in the microdroplets. The wide range of synthetic resin matrix-providing materials usable in the phase separation technique affords a wide range of values for $n_p$ to choose from initially. Thereafter, the value of $n_p$ is influenced by the amount of liquid crystal remaining dissolved in the hardened matrix after phase separation. The amount of dissolved liquid crystal is affected by rate of phase separation, e.g., rate of cooling, rate of polymerization, rate of solvent evaporation, as well as by the nature of the synthetic resin. Furthermore, not all components of a liquid crystal material are likely to be equally dissoled in the matrix.

The term "liquid crystal" or liquid crystal material refers to a liquid crystal operative in the context of the present invention; preferred liquid crystals are of the nematic type or ones that behave as nematic types, and exhibiting positive dielectric anisotropy. Such liquid material may contain other material dissolved in it, including pleochroic or dichroic dye, isotropic dye, or a small amount of the synthetic resin from which the liquid crystal was phase separated.

"Aligned" in the context of the invention refers to the fixation of the optical axis of the microdroplet in a selected direction. Alignment may be achieved by the application of an electric or magnetic field, by shearing the material to shape the droplet into an ovoid or ellipsoid, or the like as described below, or by preparing the material in the presence of a field as described in, for example, U.S. Pat. No. 4,685,771.

The term "effective index of refraction" $n_{mt}$ refers to the index of refraction of the aligned liquid crystal microdroplet presented to incident light. Maximum transparency occurs where probing light detects little or no mismatch between the index of refraction $n_p$ of the matrix and the effective index of refraction $n_{mt}$ of the microdroplet.

Accordingly the invention provides an improved light modulating material comprising microdroplets of liquid crystal dispersed in a light transmissive synthetic resin matrix, the liquid crystal being soluble in the matrix-forming composition and the microdroplets being formed spontaneously by phase separation therefrom wherein the microdroplets have an effective index of refraction $n_{mt}$ different from the index of refraction $n_p$ of the polymer so that light is transmitted through the material at a modified viewing angle.

In one aspect of the invention, the index of refraction $n_p$ of the matrix can exceed by a predetermined amount the ordinary index of refraction $n_o$ of the liquid crystal microdroplet; incident light is transmitted through the material at a selected oblique angle relative to the surface of the material when the microdroplet director is perpendicular to the surface of the material or is transmitted through an angle about the perpendicular to the material when the microdroplet director forms an angle with the material surface.

In another aspect of the invention if, the index of refraction $n_p$ of the matrix is less than the ordinary index of refraction $n_o$ of the liquid crystal microdroplet by a predetermined amount; light incident on the surface of the material either is transmitted at a predetermined narrow angle about to the perpendicular to thematerial surface when the microdroplet director is perpendicular to the material surface or is transmitted at a selected acute angle relative to the material surface when the microdroplet director forms an angle with the material surface.

The material of the invention is prepared so that the microdroplet director forms an angle with the surface of the material. Preferably, the ordinary index of refraction, $n_o$, of the liquid crystal is matched to the index of refraction, $n_p$, of the synthetic resin matrix. In this aspect of the invention the material may be prepared by phase separation in an electric or magnetic field directed at an angle to the surface of the material or the material may be sheared while in a plastic condition to shape the microdroplets into ovoids or ellipsoids. Both of these methods of preparation result in all of the microdroplet directors assuming the same preferred angle relative to the surface of the material in the absence of an external field. As always, the direction in which the microdroplet directors point can be switched or rotated by the application of a proper field, via electrodes or the like. Light modulating materials prepared in accordance with this aspect of the invetion exhibit a "Venetian blind" effect in that they have a viewing angle in all states; in the field-off state, the material is transparent at a first extreme angle relative to the surface, which angle coincides with the microdroplet director when the liquid crystal in the microdroplet is in a relaxed, equilibrium position; in the full field-on state, the material is transparent at a second extreme angle relative to the surface, which angle lies in a direction which coincides with the microdroplet director fully aligning with the applied field; in a partial field-on state, the viewing angle lies between the two extrema.

In a further aspect of the invention, multiple sheets are superimposed to yield a second light modulating material exhibiting more finely tuned angle of view light transmission and scattering properties than achievable with a single sheet. Such as second light modulating material comprises at least two sheets wherein in each sheet the effective index of refraction $n_{mt}$ is different from that of an adjacent sheet, and wherein in each sheet the index of refraction of the synthetic resin matrix $n_p$ may be equal to, greater than, or less than the ordinary index of refraction $n_o$ of the liquid crystal microdroplet.

In addition to the foregoing light modulating materials, further aspects of this invention include windows wherein the microdroplets are permanently aligned during fabrication of the light modulating materials for the windows and electro-optic devices wherein the microdroplets are electrically addressable for alignment during operation. Such windows may have the microdroplets aligned so as to be essentially opaque to incident light at selected angles or to be selectively transparent to incident light at selective angles. Such electro-optic device may include one or more sheets of the light modulating material sandwiched between conducting transparent electrodes to form a display which depends on selective energizing and deenergizing of segments or of the entirety of the material for selective transmission of light; the device may be provided with a reflective surface to form a reflectance type display. Such windows may have the microdroplets aligned so as to be transparent to incident light at an angle which is movable according to the strength of an applied field thereby acting in the manner of a Venetian blind.

Aspect of the present invention is a "heads-up" display comprising a sheet of light modulating material wherein the index of refraction $n_p$ is equal to, greater than or less than the ordinary index of refraction $n_o$ of the liquid crystal microdroplet in combination with a spaced apart light projector for displaying images on the material while otherwise the material remains clear to an observer.

Still other features and advantages will become apparent to those skilled in the art from the following description of the best modes of the invention and the accompanying drawing.

BRIEF DESCRIPTION OF THE DRAWING

In FIG. 1 a fragment of a three dimensional sheet of the material of the invention is depicted schematically in cross-sectional elevation with a representative microdroplet of liquid crystal contained in a synthetic resin matrix sheet. The angles at which light is incident upon the material, $I_o$, or is scattered away from the material, $I_s$, or is transmitted through the material, $I_T$, are all schematically depicted and idealized. More particularly, FIG. 1(A) illustrates a light modulating material where in $n_p = n_o$ with an angle of view $\alpha$.

FIG. 1(B) illustrates a light modulating material wherein $n_p < = n_o$ with an angle of view $\beta$.

FIG. 1(C) illustrates a light modulating material wherein $n_p > n_o$ with two angles of view $\tau$.

FIG. 1(D) illustrates a light modulating material wherein $n_p = n_o$ with an angle of view $\delta$.

FIG. 1(E) illustrates a light modulating material with $n_p < n_o$ with a viewing angle $\epsilon$.

FIG. 1(F) illustrates a light modulating material with $np = n_o$, wherein the microdroplet is ellipsoidally shaped, and no external field is applied.

FIG. 1(G) illustrates the light modulating material of FIG. 1(F) with an external field applied in direction E.

FIG. 2 is a diagrammatic cross-sectional elevation of an inventive window with an operating voltage source.

FIGS. 4–10 will be more fully dealt with in connection with the examples that follow.

BEST MODE FOR CARRYING OUT THE INVENTION

Figure 3:
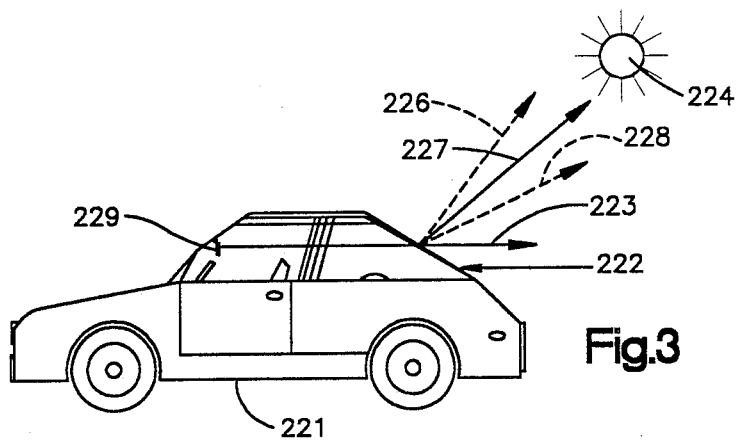
FIG. 3 illustrates the use of an inventive sunscreen window mounted in an automobile diagrammed in side elevation.

Some of the light transmission/scattering effects achievable by the invention are schematically and ideally illustrated in FIGS. 1(A)–(G). It is to be noted that in all cases, the use of the word "matching" and the use of the equal sign do not imply exact mathematical equality; $n_p$ sufficiently "matches" or equals $n_o$ when a maximization of transmitted light is achieved, relative to the light scattered where there is a mismatch.

FIG. 1(A) illustrates the angle of view $\alpha$ achievable with the light modulating materials as described in the progenitors of this application, e.g. U.S. Pat. Nos. 4,685,771 and 4,688,900. The exemplary microdroplet 11 of liquid crystal in the light transmissive matrix 10 is shown aligned with the extraordinary index of refraction orthogonal to the surface. Alignment may be achieved by application of an electric field via electrodes (not shown) or by phase separating the material in an aligning field, as in U.S. Pat. Nos. 4,685,771.

FIG. 1(B) shows a material prepared similarly to that of FIG. 1(A) with the microdroplet 21 aligned in the matrix 20 with its extraordinary index of refraction orthogonal to the surface. In contrast to the viewing angle α of FIG. 1(A), the material of FIG. 1(B) has an angle of view β narrower than α due to selecting or adjusting the relative indices of refraction so that $n_p < n_o$.

FIG. 1(C) shows a material prepared similarly to that of FIGS. 1(A) and 1(B) with the microdroplet 31 aligned in the matrix 30 with its extraordinary index of refraction orthogonal to the surface. The material of FIG. 1(C) shows two angles of view τ, when diagrammed in cross section τ oblique to the surface of the material. The two angles of view are due to selecting or adjusting the relative indices of refraction so that $n_p > n_o$.

FIG. 1(D) shows a material prepared by phase separating in an electric or magnetic field applied in the direction E. In this case, the microdroplet 41 is aligned with its extraordinary index of refraction oblique to the surface of the material. This material shows a single angle of view δ due to selecting or adjusting the relative indices of refraction so that $n_p = n_o$.

FIG. 1(E) shows a material prepared by phase separating in an electric or magnetic field applied in the direction E, similar to the material of FIG. 1(D). In this case, however, the relative indices of refraction are chosen or adjusted so that $n_p = > n_o$ resulting in angle of view ε.

FIG. 1(F) shows a material prepared by shearing to form an ellipsoidal microdroplet. The steps of preparing such a material are more fully discussed in connection with FIG. 1, below. As illustrated in the field off condition in FIG. 1(F), the orientation of the microdroplet director $n_e$ coincides with direction f defined by the major axis of the ellipsoid. The material is transparent through the angle of view σ about direction f. Application of an aligning voltage, that is a voltage sufficient to bring the microdroplet director to an equilibrium position N as nearly parallel with the direction of the field as the situational constraints will allow, results in viewing angle σ being rotated to a new position about N, as illustrated in FIG. 1(G).

When phase separation is performed in an electric field or a magnetic field that orients the long axes of the liquid crystal in the microdroplets perpendicular or oblique to a face of the sheet, the resulting sheet does not need an applied field to work as an angular discriminating window or display; it has a proper liquid crystal orientation in its hardened, switched off state and will behave as in FIG. 1, in accordance with the magnitude of the mismatch of indices or alignment of the microdroplet selected. Furthermore, if an electric or magnetic field of at least threshold value is applied in the plane of the matrix of FIGS. 1(A)-(D), this material will become a light polarizer. Such a field can be supplied by a plurality of interdigitated electrode pairs.

The value for the ordinary index of refraction $n_o$ of the liquid crystal normally used in this invention falls between about 1.4 and about 1.6 at normal use temperatures between −30° and +150°. The extraordinary index of refraction $n_e$ is higher, often falling between about 1.6 and about 1.8. Preferred liquid crystal materials comprise principally cyanobiphenyl compounds.

Many useful matrix synthetic resins have indices of refraction in about the same range as the liquid crystal materials. Thus, a variety of transparent vinyl, acrylic, polycarbonate, epoxy, polyurethane, polyester, polyamide, hydrocarbyl, and cellulosic polymer, copolymer and resin matrices are available for use here. Also available is a wide variety of ingredients that will harden together to form the matrix such as monomers, prepolymers, oligomers, curing agents, and cross linkers as well as compatible and hardenable mixtures of preformed thermoplastic matrix materials themselves. For example, an epoxy resin or a compatible blend of epoxy resins can be polymerized by a single or a mixture of curing agents; each change in kind or proportion of any reactant or other compatible component, i.e., not present as a distinct phase will give a matrix with a different refractive index if the index of refraction of the various reactants or components is different, and they usually are. The possibilities for delicate adjustment or fine tuning of the refractive index of the polymer part of the matrix relative to $n_o$ of the liquid crystal microdroplets should be evident.

As stated, some liquid crystal remains dissolved in the matrix after phase separation. Table I illustrates the influence of a preferred liquid crystal, E7, available from E. M. Industries, Inc., on various matrices. E7 has $n_o = 1.520$ and $n_e = 1.745$ at room temperature, and isotropic E7 has a refractive index of about 1.59.

TABLE I

| Synthetic Resin | Refractive Index | | | wt % | E7 np/no |
| | * | ** | *** | | |
| --- | --- | --- | --- | --- | --- |
| 1. Polycarbonate | 1.585 | 1.585 | 1.59 | 67 | 1.046 |
| 2. Epon 828 + Capcure 3-800 | 1.574 1.503 | 1.554 | 1.55 | 33 | 1.020 |
| 3. Polyvinylformyl | 1.502 | 1.502 | 1.53 | 67 | 1.006 |
| 4. Epon 812 + Capcure 3-800 | 1.478 1.503 | 1.506 | 1.51 | 33 | 0.993 |

*Refractive index of pure materials
**Refractive index of cured materials without liquid crystal
***Refractive index of cured materials with dissolved liquid crystal.

As seen in Table I, the polycarbonate—E7 light modulating material has a ratio of $n_p/n_o$ greater than 1; the angles of view for this material are those illustrated in FIGS. 1(C) and (E) wherein $n_p > n_o$. The same is true for the Epon 828+capcure light modulating material. The polyvinylformal—E7 light modulating material has a ratio of $n_p/n_o$ approximately equal to 1; the angles of view for this material are those illustrated in FIGS. 1(A) and (D) wherein $n_p = n_o$.

The Epon 812 and Capcure—E7 material has a ratio of $n_p/n_o$ less than 1 so that it will exhibit the scattering angle shown in FIG. 1(B). The materials of Table I are more specifically described in Examples 1 and 2, below.

Scanning electron micrographs of some polyvinylformal resin matrix films made with 2 parts of E7 liquid crystal and 1 part of the resin as in Table I indicate that approximately 50% of the film substance is microdroplets and 50% is matrix. Thus, the matrix phase contains about a third liquid crystal and two-thirds resin. Assuming the refractive index of the mixture to be the average by weight of the relative contributions of the parts, the calculated $n_p$ is near 1.53, which is the actual index as measured, as shown in Table I. In contrast to this are the epoxy resin matrices cured with Capcure 3-800 curing agent. The observed $n_p$ is essentially equal to the refractive index of the pure solidified polymer. This indicates that little liquid crystal is dissolved in the matrix.

Referring to FIG. 2, a clear polymeric film or matrix sheet 120, 10 μm thick, is laminated to transparent indium tin oxide electrodes 130 and 130', each 200 Å thick and covering the inner faces of clear 1 mm thick glass plates 140 and 140', respectively. Sheet 120 contains a light modulating multitude of phase separated microdroplets of nematic liquid crystal material exhibiting positive dielectric anisotropy. The droplets average about 0.2–10 μm in diameter. Electrodes 160, 160' and 170 are energized by AC or DC voltage source 180 when switch 190 is closed. In switched off state the window is opaque. A light source, window holding means such as a frame, sash, moulding or mounting are not shown; these are provided in a conventional fashion. At threshold and higher voltage this discriminating window has the following light-transmitting characteristics:

Case I: $n_o$ of the liquid crystal is substantially equal to $n_p$ of the matrix. The window is transparent when viewed in one direction, but diffuse or opaque when viewed at another angle. Depending upon whether the material is prepared with the extraordinary index of refraction orthogonal or oblique to the surface, some possible angles of view correspond to those illustrated in FIGS. 1(A) and 1(D).

Case II: $n_o$ is smaller than $n_p$. As shown, the window is transparent when viewed from a particular angle or range of angles away from the perpendicular, but diffuse when viewed in a direction perpendicular to the window surface. The angle for maximum transparency depends upon the value of $n_o$ relative to $n_p$. Again, depending upon the direction of the extraordinary index of refraction, some possible viewing angles are illustrated in FIGS. 1(C) and 1(E).

Case III: $n_o$ is larger than $n_p$. This condition is like that of Case I, above, except that the transmission or clear state appears at a narrower angle of view. By adjusting the value of $n_o$ relative to $n_p$ the degree of transparency and range of angles from normal over which the window is quite transparent becomes narrower or broader and is illustrated in FIG. 1(B).

The automobile 221 diagrammed in FIG. 3 is of a familiar hatchback style. Fitted into a wide aperture in the upswingable rear door or hatch by a moulding is a window 222 presenting a large expanse of a glass surface almost normal to the sun 224. Window 222 is set flush with the hatchback and runs from the belt line of the auto up to near the roof. Hatch, window and moulding are not shown. In actuality, that window is a laminate like that of Case II. The line of clear sight runs horizontally from a rear view mirror 229 directly back to any following vehicles, etc; it is schematically indicated by line 223.

Direct sunlight striking window 222 is scattered as indicated schematically by lines 226, 227 and 228 and does not penetrate the window directly to a bothersome degree.

Clearly other applications of the inventive window are evident. Thus, the window could be installed in a conventional sash casement for use in a architectural structure such as an office, factory or home. It could serve as a sunshield that admitted pleasant non-oppressive daylight. Means for holding, stiffening, and protecting the matrix with the liquid crystal microdroplets are conventional. Collectively these are means for holding the matrix in some desired position.

Thus, transparent substrate and cover plates of glass or plastic can be used, and even one or both of these can be dispensed within some structures. The windows can be planar, concave, convex, or variously curved, as the architectural mileau demands.

The following examples show how this invention has been carried out, but should not be construed as limiting the invention. In this specification all parts are parts by weight, all percentages weight percentages, all temperatures are in degrees Celsius, and all refractive index values those for 20° C. unless otherwise expressly noted.

EXAMPLE 1

Three different 25 μm thick polymeric films containing phase separated E7 liquid crystal microdroplets were sandwiched between 1 mm thick transparent glass slides to make angular discriminating windows exhibiting three different cases of index mismatch. The transparent electrodes were indium tin oxide coated on the inside of each slide.

A film of the solution of liquid crystal in matrix-providing material was deposited between the pair of glass slides spaced apart by 10 μm Alufrit (a trademark of Atomergic Chemicals Corp.) alumina spacers, then the film was hardened whereby a light modulating multitude of microdroplets formed spontaneously and became stabilized in position and size in the matrix.

At zero voltage across the electrodes the windows were opaque. At voltage across the electrodes of slightly above 2v/μm they became variously transparent according to the angles of view Θ through them.

The film of the first window (formulation 4 on Table I) had the refractive index of the matrix $n_p$ substantially less than the ordinary refractive index $n_o$ of the liquid crystal. It was made by the PIPS process, specifically by curing a solution of equal parts of Epon 812 epoxy resin, Capcure 3-800 curing agent, and, the E7 liquid crystal at 86° for 4 hours. The matrix was thermoset.

The refractive index of the hardened resin without any liquid crystal was 1.506, that of the matrix with liquid crystal was 1.51, and the ratio of $n_p/n_o$ was 0.993.

Epon 812 is a product available from Polysciences, Inc., Warrington, Pa. It has refractive index of 1.478 at 20° and molecular weight per oxirane unit of 145.

The Capcure 3-800 agent is a product of Wilmington Chemical Company. It has viscosity of 10,000 cps. at 20°, molecular weight units per equivalent oxirane unit of 185–200, specific gravity of 1.15 at 20°/20°, and refractive index of 1.503 at 20°.

E-7 liquid crystal is 50% 4'-n-pentyl-4-cyanobiphenyl (5CB), 21% 4'-n-heptyl-4-cyanobiphenyl (7CB), 16% 4'-n-octoxy-4-cyanobiphenyl (8CB), and 12% 4'-n-pentyl-4-cyanoterphenyl. It exhibits positive dielectric anisotropy. Its ordinary index of refraction, $n_o$, is 1.520; its extraordinary index of refraction is 1.745. Its nematic to crystalline phase transition temperature is $-10°$, and it has a liquid crystal to isotropic phase transition temperature of 60.5°.

The film of the second window (formation 3 on Table I) had the refractive index of its matrix, $n_p$, that was substantially equal to the ordinary refractive index $n_o$ of the E7 liquid crystal. It was made by the TIPS process, specifically by cooling down a solution of 2 parts of the liquid crystal and one part of polyvinylformal polymer from 200° to 50° in about 5 minutes. The matrix was thermoplastic. The polyvinylformal polymer is a product of Aldrich Chemical Company, Milwaukee, Wisconsin. It has powder density of 1.23 grams per ml., glass transition temperature of 108°, and refractive index of 1.502. The refractive index of the hardened matrix was 1.53, and the ratio of $n_p/n_o$ was 1.006.

The film of the third window (formulation 1 on Table I) had the refractive index of the matrix $n_p$ substantially higher than the ordinary refractive index $n_o$ of the E7 liquid crystal. It was made by the TIPS process, specifically by cooling down a solution of 2 parts of E7 liquid crystal and a part of polycarbonate resin from 200° to 50° in about minutes. The matrix was thermoplastic. The polycarbonate resin is a product of Aldrich Chemical Company. Its molecular weight is 20000-25000, its density 1.20 grams per ml., its glass transition temperature 150°, and its refractive index 1.585. The refractive index of the hardened matrix was 1.59, and the ratio of $n_p/n_o$ was 1.046.

Figure 4:
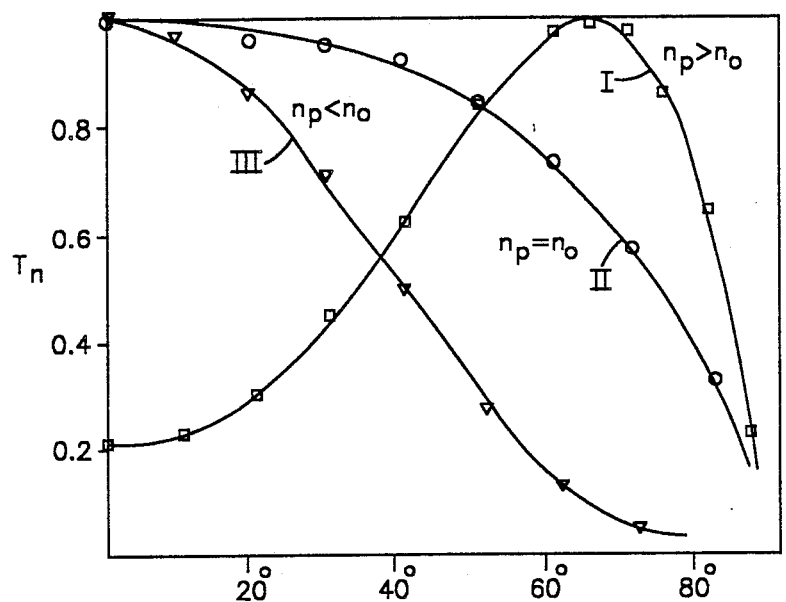
FIGS. 4, 6, and 7 are plots of measured transparency versus angle of view for various of the light modulating materials under a variety of conditions.

FIG. 4 is a plot of the normalized transparency $T_N$ of each of the above windows against various angles of view $\Theta$ through a particular window. The maximum transparency of the window is taken to be unity. All the transparencies detected through the same window are some fraction of that, hence they are normalized transparencies.

Figure 5:
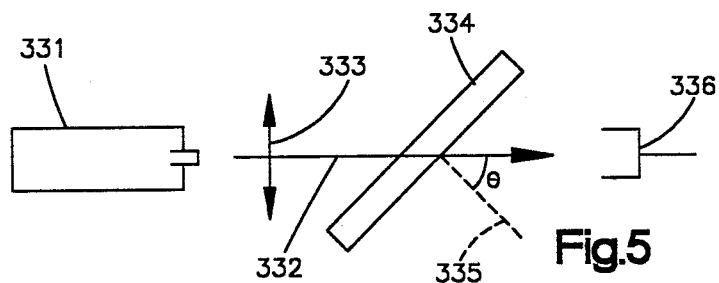
FIGS. 5 and 8 are diagrams of the apparatus used for deriving the plots of FIGS. 4, 6 and 7, respectively.

FIG. 5 is a diagram of the apparatus used for measuring the transparencies of the window at various angles of view. Visible light source 331 directs rays along line-of-sight 332 at light detector 336. The light source is a pulsed d.c. helium neon laser. Polarizer 333 permits only that component of light in the horizontal plane of the line of sight to pass. Some or all of that light goes through the discriminating window 334 and on to the detector. This depends upon the angle of view $\Theta$ setting of the window. Angle is measured between line 335, perpendicular to the window surface, and line-of-sight 332. The collection angle for detector 336 is about 1°.

Curve I of FIG. 4 is the angular light scattering profile for the third window. It corresponds to Case II described above. Maximum transparency occurs when $\Theta$ is about 70°. A smaller or larger $\Theta$ causes a drastic drop in transparency.

Curve II of FIG. 4 is the angular light scattering profile for the second window. It corresponds to Case I described above. It has maximum transparency for direct-on viewing and drops off more slowly when $\Theta$ is increased.

Curve III of FIG. 4 is the angular light scattering profile for the first window. It corresponds to Case III described above. Maximum transparency is When $\Theta$ =zero, i.e., direct-on viewing. It drops off radically as $\Theta$ is increased.

EXAMPLE 2

Figure 6:
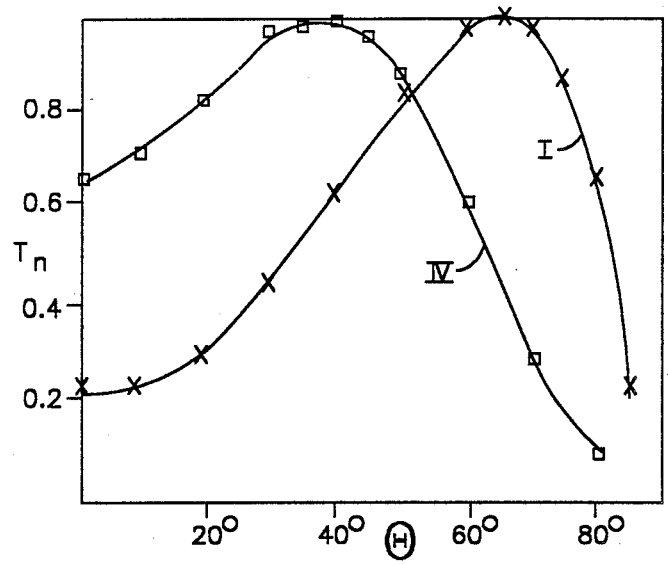

FIG. 6 demonstrates one way in which the light transmissibility for a given angle of view $\Theta$ is responsive to difference in formulation of phase separated transparent polymer matrices when they are switched on.

Curve I of FIG. 6 is a copy of Curve I of FIG. 4 with its $\Theta$ for maximum transparency approaching 70°. This window (formulation 1 on Table I) was made with polycarbonate and E7 in a 2 to 1 ratio; the ratio of $n_p/n_o$ was 1.046. Curve V of FIG. 6 is a plot of the normalized transparency $T_N$ *of a window of the same thickness and tested the same way, but made by the PIPS process (formulation* 2 on Table I); equal parts of Epon 828 bisphenol A-epichkorohydrin epoxy resin, Capcure 3-800, and liquid crystal E7 were cured at 60° for 4 hours. The Epon 828 is available from the Miller Stephenson Co., Stamford, Conn. It is a bisphenol A-epichlorohydrin epoxy resin having viscosity of 11,000 cps. at 25°, 185-200 molecular weight units per oxirane unit, and refractive index of 1.574 at 20°. When this resin is cured without any liquid crystal, its refractive index is 1.554; cured as the matrix for liquid crystal here it is 1.55. The ratio of $n_p/n_o=1.020$.

As seen on FIG. 6, a shift in the ratio of $n_p/n_o$ from 1.046 to 1.020 results in a shift of the viewing angle, as illustrated in FIG. 1(C) from about 70° from normal to about 25° from normal.

By stacking these films, the angle of maximum transmission of light can be narrowed as well as shifted. Thus, referring again to FIG. 6, the point where Curves I and IV cross is near the point of maximum light transmission for stacked windows of formulations 1 and 2 on Table I. The restricted area under the crossing point is bounded by a narrowed light scattering profile for the stacked window, that is the overlap of the individual profiles of each window.

EXAMPLE 3

Figure 7:
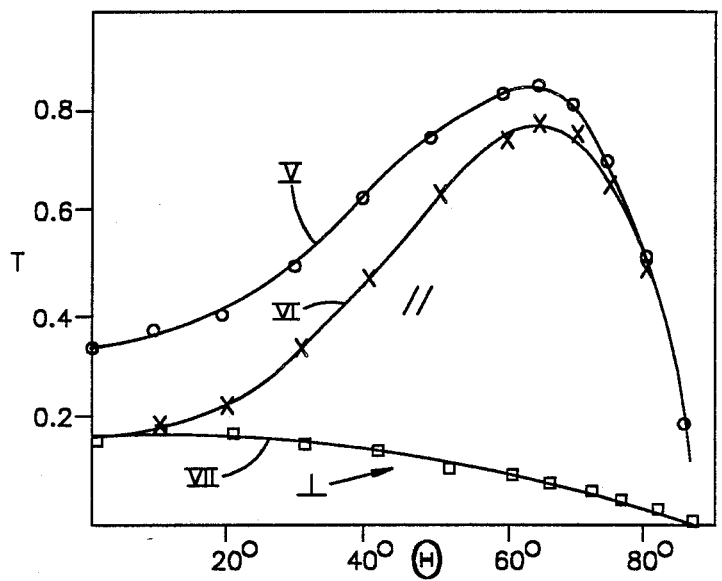

FIG. 7 shows the effect of polarized visible light on angular discrimination. The film of the window was made with polycarbonate resin and E7 liquid crystal as described in Example 1 (formulation 1 on Table I). The transparency is not normalized, but expressed as the ratio of the light intensity passing through the window apparatus of FIG. 8 when that apparatus is switched on divided by the light intensity in the absence of any window at all.

Figure 8:
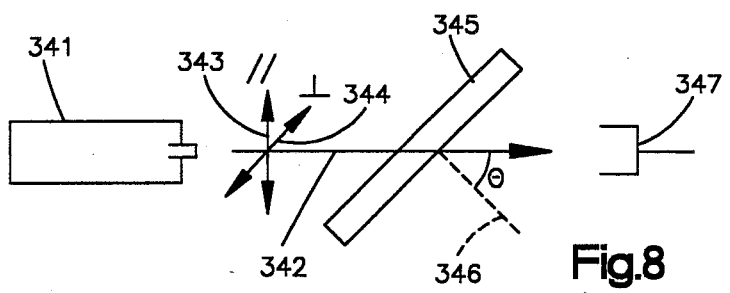

In FIG. 8, the source of visible light is a helium neon laser 341 delivering light along line-of-sight 342. Polarized light penetrating window 345 at various angles of view is detected by detector 347.

Window 345 is set at various angles of view $\Theta$. $\Theta$ is that angle between line-of-sight 342 and line 346 normal to window 345.

Curve VI represents light passing to the detector when a polarizer 343 is interposed between the laser light source 341 and the window. Polarizer 343 passes only that component of light that is in the horizontal plane of line-of-sight 342.

EXAMPLE 4

Figure 9:
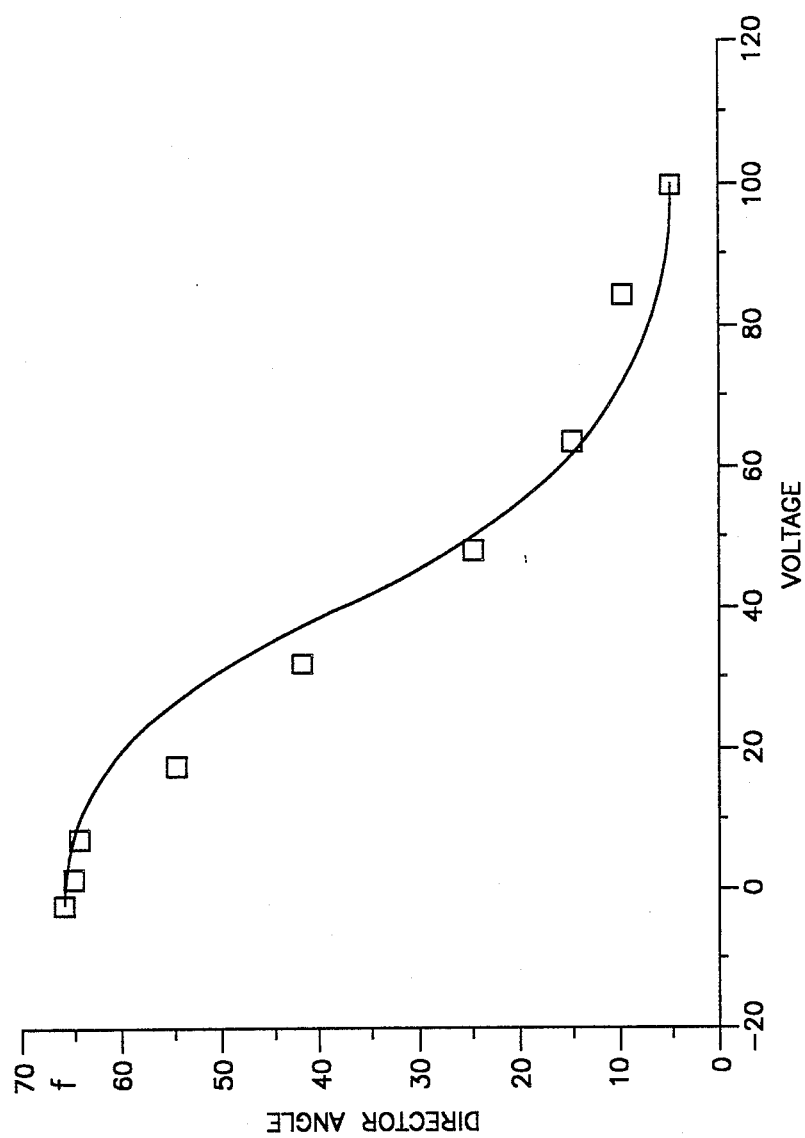
FIG. 9 is a plot of viewing angle versus voltage applied to a light modulating material as in FIG. 1(G).
Figure 11:
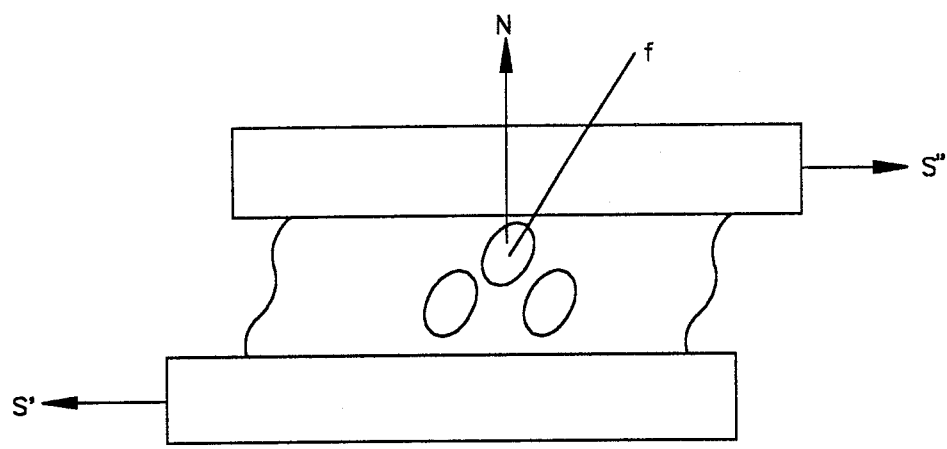
FIG. 11 illustrates a light modulating material with shaped and aligned microdroplets obtained by shearing the material between glass plates; the direction of shear is indicated by arrows, S, S".

FIG. 9 demonstrates a "Venetian blind" achievable with the materials of the present invention. The film of the Venetian blind was made with poly(vinylformal) (PVF) mixed with liquid crystal E7 in a ratio of ½ by weight. The mixture was heated until a homogeneous state was achieved, placed between electrode bearing glass substrates separated at 25 μm with Alufrit spacers, and processed according to the TIPS method, with spontaneous formation of liquid crystal micro-droplets. The film was rewarmed to a temperature at which the PVF matrix was soft, the glass substrates were slightly sheared relative to each other in the directions S', S" as illustrated in FIG. 1 so as to shape the microdroplets, and the matrix was then allowed to cool. Microscopic observation of the resultant cell revealed that the uniformity of microdroplet alignment varied slightly from region to region.

Figure 10:
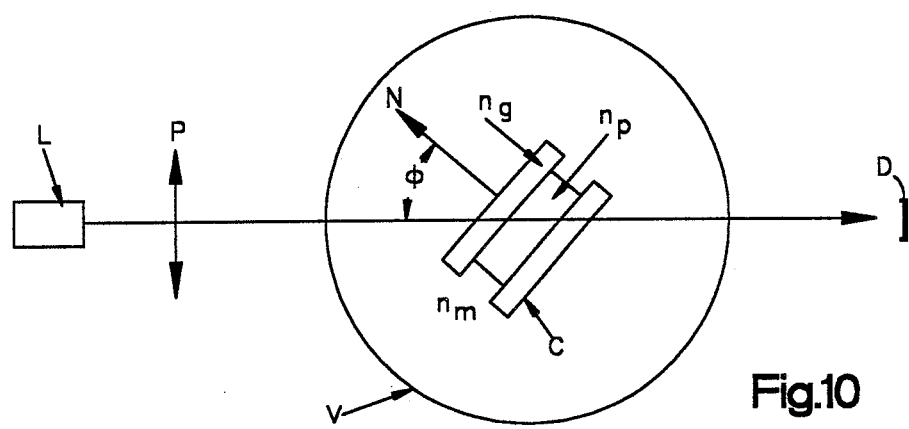
FIG. 10 is a diagram of the apparatus used for deriving the plot of FIG. 9.

FIG. 10 illustrates the experimental configuration used in generating the "Venetian blind" effect illustrated in FIG. 9. A source of laser light L polarized in direction P was aimed through a cyclindrical vial V containing the cell C to a detector D having a collection angle of less than about 2°. The vial was filled with a fluid having an index of refraction matching that of the glass substrates of the cell so as to avoid Fresnel reflections. The location of the microdroplet director in the absence of an applied field was determined by rotating the cell until maximum transparency was observed by D. This location coincided with direction f and is so labeled at about 65° from normal on FIG. 9. The angle formed by the microdroplet director and the perpendicular to the cell is labeled $\phi$. As the voltage was increased by applying a field across the electrode bearing glass substrates so as to cause a field in direction N (which coincides with the perpendicular to the cell), the microdroplet director started to align with the field by decreasing the magnitude of angle $\phi$. The decrease of 100 with increasing voltage is plotted in FIG. 9. At a maximum voltage beyond which the microdroplet director will no longer respond, the cell is transparent at $\approx 5°$ which is nearly perpendicular to the cell surface. Thus a window or a display made from the material of this example will act as a "Venetian blind" and will be transparent at an angle from the perpendicular of about 5° to about 65°, depending on the strength of the applied field.

Many modifications and variations of the invention will be apparent to those skilled in the art in the light of the foregoing disclosure. Therefore, it is to be understood that, within the scope of the appended claims, the invention can be practiced otherwise than has been specifically shown and described.

We claim:

1. In a light modulating material comprising microdroplets of liquid crystal dispersed in a light transmissive synthetic resin matrix, the liquid crystal being soluble in the matrix-providing composition and the microdroplets being formed spontaneously by phase separation therefrom, the improvement wherein the ratio of the ordinary index of refraction of the liquid crystal microdroplets to the index of refraction of the matrix has a value such that when the optical axes of the microdroplets are aligned perpendicular to the surface of the material, incident light is transmitted through the material through a narrow viewing-angle about the perpendicular to the surface or through a viewing-angle oblique to the surface or such that when the optical axes of the microdroplet are aligned oblique to the surface of the material, incident light is transmitted through the material at a viewing-angle oblique to the surface or is transmitted through a viewing-angle about the perpendicular to the surface.

2. The material of claim 1 wherein the ratio is greater than one so that when the optical axes of the microdroplets are aligned perpendicular to the surface of the material light is transmitted through a narrow viewing-angle about the perpendicular to the surface.

3. In a light modulating material comprising microdroplets of liquid crystal dispersed in a light transmissive synthetic resin matrix, the liquid crystal being soluble in the matrix-providing composition and the microdroplets being formed spontaneously by phase separation therefrom, the improvement wherein the ratio of the ordinary index of refraction of the liquid crystal microdroplets to the index of refraction of the matrix is less that one so that when the optical axes of the microdroplets are aligned perpendicular to the surface of the material light is transmitted through viewing-angles oblique to the surface or so that when the optical axes of the microdroplets are aligned at an oblique viewing-angle relative to the surface, light is transmitted through the material at a viewing-angle about the perpendicular to the surface.

4. The material of claim 1 wherein the ratio is equal to about one and the optical axes of the microdroplets are aligned at an angle relative to the surface of the material, so that light is transmitted through the material at a viewing-angle that generally coincides with the angle of alignment of the optical axes of the microdroplets.

5. In a light modulating material comprising microdroplets of liquid crystal dispersed in a light transmissive synthetic resin matrix, the liquid crystal being soluble in the matrix-providing composition and the microdroplets being formed spontaneously by phase-separation therefrom, the improvement wherein the microdroplets are ellipsoidal with the long axes of the ellipses aligned at an angle oblique to the surface of the material, wherein the optical axes of the microdroplets are aligned generally with the long axes of the ellipses so that in the absence of an applied field light is transmitted through the material at a viewing-angle that generally coincides with the angle of alignment of the optical axes of the microdroplets, and wherein the optical axes of the microdroplets are movable by the application of an external field and the viewing-angle is movable along optical axes of the microdroplets.

6. The material of claim 5 wherein the ratio is less than, equal to, or greater than one.

7. A light modulating material comprising at least two sheets of a light transmissive synthetic resin matrix containing dispersed microdroplets of liquid crystal wherein the effective index of refraction of the microdroplets in each sheet is different from the effective index of refraction of the microdroplets in an adjacent sheet.

8. A light modulating material comprising at least two sheets of a light transmissive synthetic resin matrix containing dispersed microdroplets of liquid crystal wherein the ratio of the index of refraction of the synthetic resin matrix to the ordinary index of refraction of the microdroplets in one sheet differs from the ratio of the index of refraction of the synthetic resin matrix to the ordinary index of refraction of the microdroplets in an adjacent sheet.

9. A window for selectively scattering away incident light and suitable for use in a vehicle or an architectural structure, the window comprising liquid crystal microdroplets dispersed in a light transmissive synthetic resin matrix, the microdroplets having their extraordinary indices of refraction aligned at a selected angle relative to a planar surface of the matrix, the liquid crystal being soluble in the matrix-forming composition and the microdroplets being formed spontaneously by phase separation therefrom, and the ordinary index of refraction of the microdroplets is deliberately mismatched relative to the index of refraction of the matrix by a selected amount to achieve an effective refractive index such that said material exhibits maximum transparency through a viewing angle which is one of a predetermined angle about a perpendicular to the surface or an angle oblique to the surface, while light incident on same surface at angles other than the viewing angle is primarily diffused or scattered.

10. The window of claim 9 wherein the ordinary index of refraction of said microdroplets is greater than the index of refraction of said matrix.

11. The window of claim 9 wherein the ordinary index of refraction of said microdroplets is less than the index of refraction of said matrix.

12. A window for selectively scattering away incident light and suitable for use in a vehicle or an architectural structure, the window comprising microdroplets of liquid crystal dispersed in a light transmissive synthetic resin matrix, the microdroplets having their extraordinary indices of refraction aligned at a selected angle relative to a planar surface of the matrix, the liquid crystal being soluble in the matrix-forming composition, the microdroplets being formed spontaneously by phase separation therefrom, and the ordinary index of refraction of the matrix exceeding the refractive index of the microdroplet by a predetermined amount such that light that is incident on the window at a selected angle will be transmitted through the window while incident light at other angles will be diffused or scattered.

13. The window of claim 12 wherein the extraordinary indices of said microdroplets are aligned perpendicular to said surface.

14. The window of claim 12 where the extraordinary indices of refraction of said microdroplets are aligned at an oblique angle to said surface.

15. A window for selectively scattering away incident light and suitable for use in a vehicle or an architectural structure, the window comprising microdroplets of liquid crystal dispersed in a light transmissive synthetic resin matrix, the microdroplets having their extraordinary indices of refraction aligned at a selected angle relative to a planar surface of the matrix, the liquid crystal being soluble in the matrix-forming composition and the microdroplets being formed spontaneously by phase separation therefrom, and the ordinary index of refraction of the microdroplets being less than the refractive index of the matrix by a predetermined amount such that light that is incident on the window at a selected angle will be transmitted through the window while incident light at other angles will be diffused or scattered.

16. The window of claim 15 wherein the extraordinary indices of said microdroplets are aligned perpendicular to said surface.

17. The window of claim 15 where the extraordinary indices of refraction of said microdroplets are aligned at an oblique angle to said surface.

18. A window for selectively scattering away incident light and suitable for use in a vehicle or an architectural structure comprising two sheets of a light transmissive synthetic resin matrix containing dispersed microdroplets of liquid crystal wherein the effective index of refraction of the microdroplets in each sheet is different from the effective index of refraction of the microdroplets in an adjacent sheet.

19. A window for selectively scattering away incident light and suitable for use in a vehicle or an architectural structure comprising two sheets of a light transmissive synthetic resin matrix containing dispersed microdroplets of liquid crystal wherein the ratio of the index of refraction of the synthetic resin matrix to the ordinary index of refraction of the microdroplets in one sheet differs from the ratio of the index of refraction of the synthetic resin matrix to the ordinary index of refraction of the microdroplets in an adjacent sheet.

20. In a method of making a light modulating material comprising microdroplets of liquid crystal dispersed in a light transmissive synthetic resin matrix, the liquid crystal being soluble in the matrix-providing composition and the microdroplets being formed spontaneously by phase separation therefrom, the improvement comprising the step of adjusting the ratio of the ordinary index of refraction of the liquid crystal microdroplets to the index of refraction of the matrix to a value such that when the microdroplet directors are aligned perpendicular to the surface of the material, incident light is transmitted through the material through a narrow viewing-angle about the perpendicular to the surface or through a viewing-angle oblique to the surface or such that when the microdroplet directors are aligned oblique to the surface of the material, incident light is transmitted through the material at a viewing-angle oblique to the surface or is transmitted through a viewing-angle about the perpendicular to the surface.

21. The method of claim 20 wherein the ratio is adjusted to a value greater than one so that when the microdroplet directors are aligned perpendicular to the surface of the material light is transmitted through a narrow viewing-angle about the perpendicular to the surface.

22. The method of claim 20 wherein the ratio is adjusted to a value less than one so that when the microdroplet directors are aligned perpendicular to the surface of the material light is transmitted through a viewing-angle oblique to the surface or so that when the microdroplets are aligned at an oblique viewing-angle relative to the surface, light is transmitted through the material at a viewing-angle about the perpendicular to the surface.

23. The method of claim 20 wherein the ratio is adjusted to a value equal to about one and including the further step of aligning the microdroplet directors at an angle relative to the surface of the material, so that light is transmitted through the material at a viewing-angle that generally coincides with the angle of alignment of the microdroplet directors.

24. The method of claim 20 including the further step of forming the microdroplets into ellipsoidal shapes with the long axes of the ellipses aligned at an angle oblique to the surface of the material, so that in the absence of an applied field the microdroplet directors are aligned generally with the long axes of the ellipses and incident light is transmitted through the material at a viewing-angle that generally coincides with the angle of alignment of the microdroplet directors.

25. The method of claim 24 wherein the ratio is adjusted to a value of less than, equal to, or greater than one.

26. In a method of making a light modulating material comprising microdroplets of liquid crystal dispersed in a light transmissive synthetic resin matrix, the liquid crystal being soluble in the matrix-forming composition and the microdroplets being formed spontaneously by phase separation therefrom, the improvement comprising the steps of determining a maximum viewing angle through which light incident to a planar surface of said material passes through said material, while incident light at other angles is primarily diffused or scattered, and deliberately mismatching the ordinary index of refraction of said microdroplets relative to the index of refraction of said matrix by a selected amount that results in an effective refractive index such that said maximum viewing angle is achieved when the extraordinary indices of the microdroplets are aligned at a selected angle relative to said surface.

27. The method of claim 26 wherein the step of deliberately mismatching comprises selecting a liquid crystal such that the ordinary index of refraction of said microdroplets is greater than the index of refraction of said matrix.

28. The method of claim 26 wherein the step of deliberately mismatching comprises selecting a liquid crystal such that the ordinary index of refraction of said microdroplets is less than the index of refraction of said matrix.

29. The method of claim 26 including the step of aligning the extraordinary indices of said microdroplets perpendicular to said surface.

30. The method of claim 26 including the step of aligning the extraordinary indices of refraction of said microdroplets at an oblique angle to said surface.

31. A method of making a light modulating material comprising microdroplets of liquid crystal having positive dielectric anisotropy dispersed in a light transmissive synthetic resin matrix, said liquid crystal being soluble in the matrix-forming composition and said microdroplets being formed spontaneously by phase separation therefrom, the improvement comprising the step of deliberately mismatching the ordinary index of refraction of said microdroplets relative to the index of refraction of said matrix by a selected amount in order to achieve an effective refractive index such that when the extraordinary indices of refraction of the microdroplets are aligned at a selected angle relative to a planar surface of said material light incident to said surface at a predetermined maximum viewing angle passes through said material, while light at other incident angles is primarily diffused or scattered.

32. A light modulating material comprising liquid crystal microdroplets dispersed in a resin matrix having a generally planar surface, said microdroplets being formed by phase separation and having their optical axes prealigned in a first direction oblique to said surface in the absence of an aligning field, and said material being responsive to an aligning field having a second direction relative to said surface so that the prealigned optical axes of said microdroplets are caused to rotate from said first direction toward said second direction, thereby changing the viewing angle at which light is transmitted through said material.

33. The light modulating material of claim 32 wherein the ordinary index of refraction $n_o$ of said liquid crystal microdroplets is matched to the index of refraction $n_p$ of said matrix so that maximum transparency to light incident upon said surface is in said first direction of prealignment of said optical axes, and said material having the characteristic of exhibiting different angles of maximum transparency for different magnitudes of said aligning field.

34. The material of claim 32 or claim 33 wherein said optical axes of said microdroplets are prealigned by one of: (a) mechanical shear, (b) an electric field, or (c) a magnetic field.

35. A light modulating device comprising:
a light modulating material formed by liquid crystal microdroplets dispersed in a light transmissive resin matrix having a generally planar surface, said liquid crystal microdroplets being formed by phase separation and having their optical axes prealigned in a first direction oblique to said surface;
electrodes adjacent said surface of said material; and
means for applying a voltage to said electrodes to establish an electric field in said material in a direction perpendicular to said surface so as to rotate the direction of alignment of said optical axes closer to said perpendicular direction in proportion to said voltage, whereby the direction of transparency for light incident upon said surface is controlled by said voltage and approaches said perpendicular direction as said voltage increases.

36. A light modulating material comprising at least two sheets stacked face-to-face, each of said sheets comprising a resin matrix containing microdroplets of liquid crystal dispersed in said matrix, said microdroplets being formed by phase separation from a solution of liquid crystal and resin upon solidifying of said resin, said material being characterized in that the ratio of the index of refraction of said matrix to the ordinary index of refraction of said microdroplets in one sheet differs from the corresponding ratio in the other sheet, whereby each of said sheets exhibits a different angle of transparency to light incident upon the face thereof, said material exhibiting an overall angle of transparency lying between the different angles of transparency of said two sheets.

37. A light modulating device comprising:
a light modulating material comprising liquid crystal microdroplets dispersed in a light transmissive resin matrix having a generally planar surface, said liquid crystal microdroplets being formed by phase separation and having their optical axes prealigned in a first direction oblique to said surface in the absence of an aligning field, and said material being responsive to an aligning field having a second direction relative to said surface so that the prealigned optical axes of said microdroplets are caused to rotate from said first direction toward said second direction, thereby changing the viewing angle at which light is transmitted through said material;
electrodes adjacent said surface of said material; and
means for applying a voltage to said electrode means to establish an electric field in said material in a direction perpendicular to said surface so as to rotate the direction of alignment of said optical axes closer to said perpendicular in proportion to said voltage whereby the direction of transparency for light incident upon said surface is controlled by said voltage and approaches said perpendicular direction as said voltage increases.

38. A method of making a light modulating material containing liquid crystal microdroplets dispersed in a light transmissive resin matrix having a generally planar surface, said microdroplets being formed by phase separation, said material having an optimum viewing angle oblique to the surface of said material wherein the material exhibits maximum transparency, said method comprising the steps of:
establishing said optimum viewing angle oblique to the surface of said material;
selecting a liquid crystal having an ordinary index of refraction, $n_o$, which is related to the index of refraction of the matrix, $n_p$, such that said material exhibits the optimum viewing angle when the optical axes of the microdroplets are aligned in a selected direction relative to the surface of said material; and
forming the liquid crystal microdroplets in said light transmissive resin matrix by phase separation.

39. A light modulating device comprising:
a light modulating material formed by liquid crystal microdroplets dispersed in a light transmissive resin matrix having a generally planar surface and the ordinary index of refraction, $n_o$, of the microcrystal being equal to or greater than the index of refraction of the matrix, $n_p$, said liquid crystal microdroplets being formed by phase separation, said resin being solidified in the presence of an aligning field having a direction and a magnitude sufficient to align the optical axes of said microdroplets in a direction oblique to said surface so that said optical axes remain aligned in said oblique direction upon removal of said aligning field;

electrode adjacent said surface of said material; and means for applying a voltage to said electrode means to establish an electric field in said material in a direction perpendicular to said surface so as to rotate the direction of alignment of said optical axes closer to said perpendicular direction in proportion to said voltage, whereby the direction of transparency for light incident upon said surface is controlled by said voltage.

* * * * *